(12) United States Patent
Ma et al.

(10) Patent No.: US 12,384,446 B1
(45) Date of Patent: Aug. 12, 2025

(54) THREE SEGMENT INTERMEDIATED SHAFT

(71) Applicant: Steering Solutions IP Holding Corporation, Saginaw, MI (US)

(72) Inventors: Hui Ma, Jiangsu (CN); Polen Li, Jiangsu (CN); Brandon L. Finney, Midland, MI (US); Ace Jiang, Jiangsu (CN); Carl R. Castanier, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/746,988

(22) Filed: Jun. 18, 2024

(30) Foreign Application Priority Data

Jun. 5, 2024 (CN) .......................... 202410725062.2

(51) Int. Cl.
*B62D 7/22* (2006.01)
*B62D 1/20* (2006.01)
*B62D 7/20* (2006.01)

(52) U.S. Cl.
CPC .................. *B62D 1/20* (2013.01); *B62D 7/20* (2013.01); *B62D 7/224* (2013.01)

(58) Field of Classification Search
CPC .......... B62D 1/192; B62D 7/20; B62D 7/224; B62D 1/20
USPC .......................................................... 74/469
See application file for complete search history.

(56) References Cited

U.S. PATENT DOCUMENTS

| 6,223,619 | B1 | 5/2001 | Shibata et al. | |
| 2009/0249916 | A1* | 10/2009 | Ridgway | B62D 1/192 |
| | | | | 74/492 |
| 2016/0207559 | A1* | 7/2016 | Braun | B62D 1/185 |
| 2018/0347635 | A1* | 12/2018 | Kim | B62D 1/20 |

FOREIGN PATENT DOCUMENTS

| DE | 102007060149 A1 | 6/2009 | |
| DE | 102021110858 A1 | 11/2021 | |
| WO | WO-2007065960 A1 * | 6/2007 | B62D 1/185 |

* cited by examiner

*Primary Examiner* — T. Scott Fix
(74) *Attorney, Agent, or Firm* — Dickinson Wright PLLC

(57) ABSTRACT

An I-shaft assembly includes an upper shaft extending along an axis between a first upper end and a first lower end bounding a first hollow bore. An intermediate shaft extends along the axis between a second upper end and a second lower end bounding a second hollow bore. The second upper end is disposed in the first hollow bore. A lower shaft extends along the axis between a third upper end and a third lower end disposed in the second hollow bore. The upper shaft is releasably fixed for controlled movement along the axis relative to the intermediate shaft, and the lower shaft is releasably fixed against movement along the axis relative to the intermediate shaft during a normal operating condition. The upper shaft moves along the axis relative to the intermediate shaft and the lower shaft moves along the axis relative to the intermediate shaft during an abnormal operating condition.

20 Claims, 5 Drawing Sheets

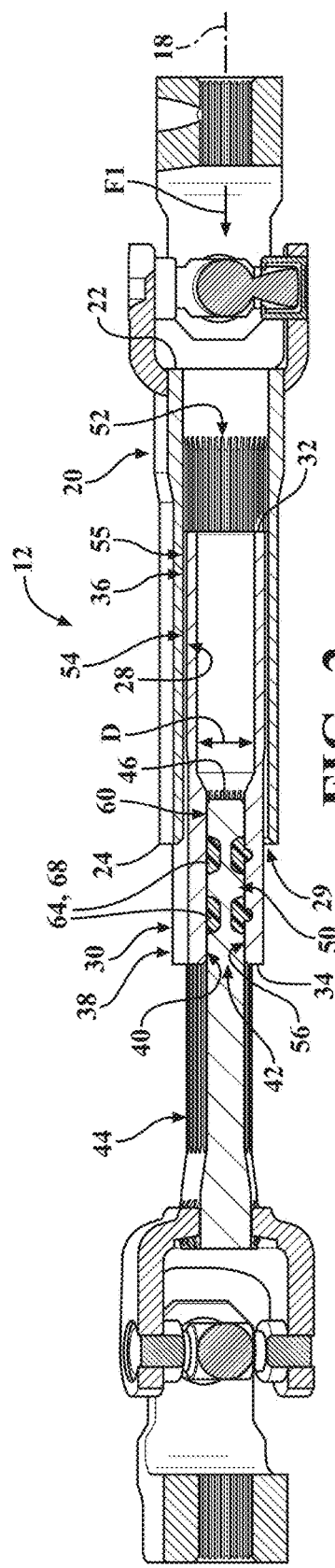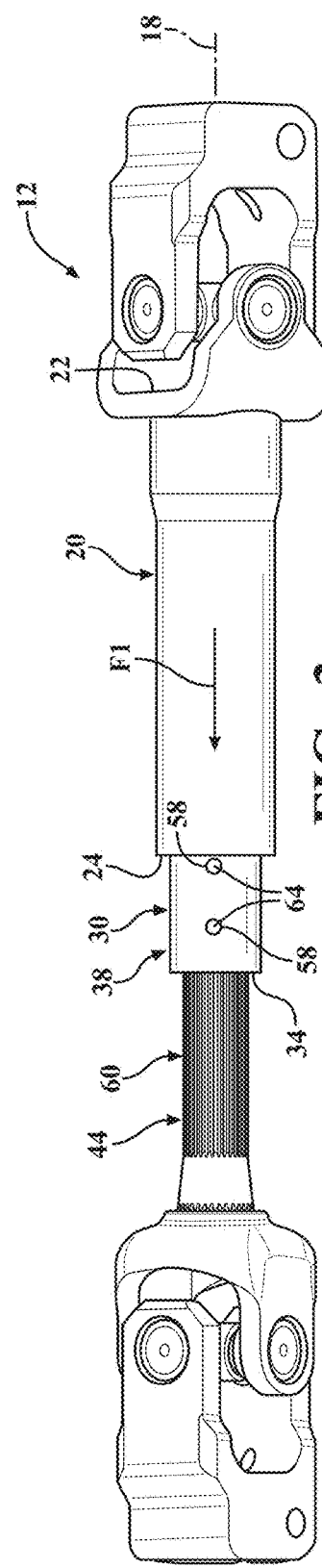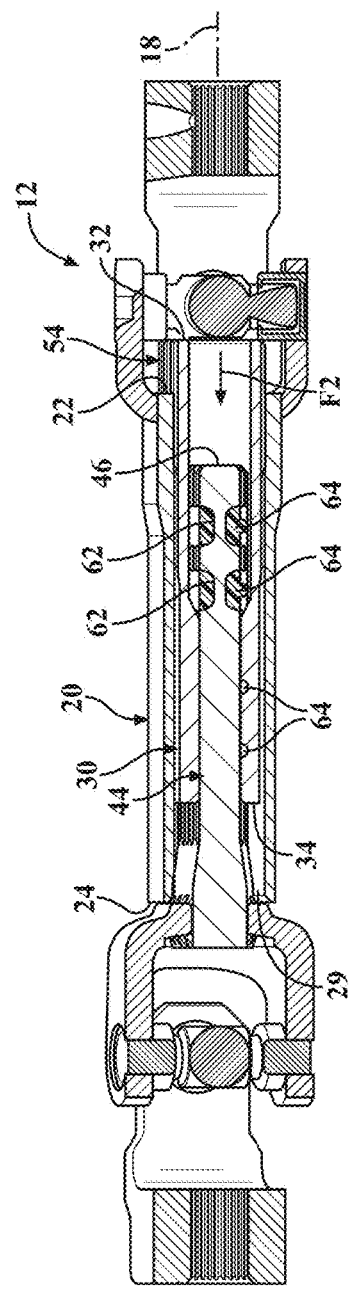

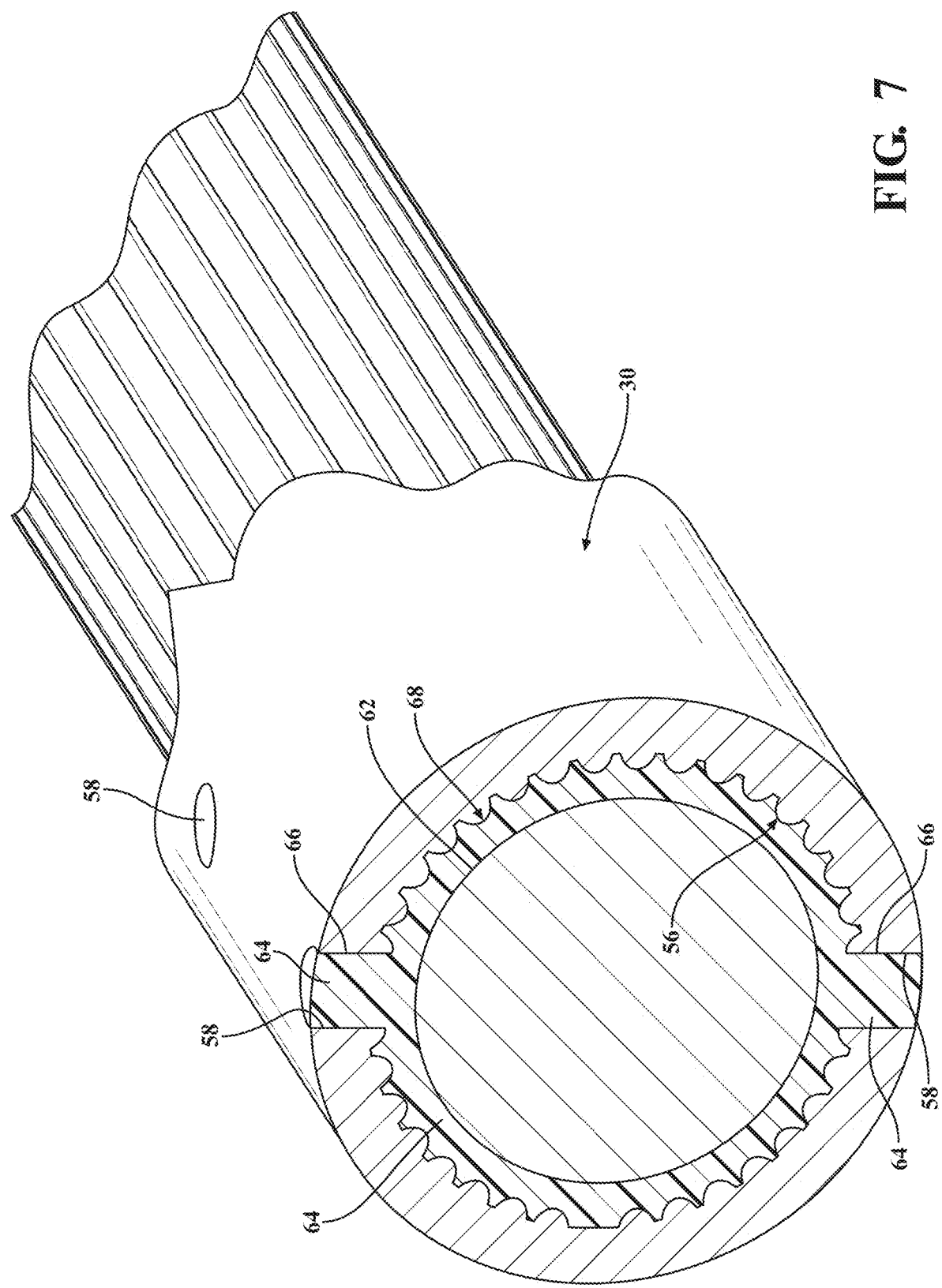

THREE SEGMENT INTERMEDIATED SHAFT

CROSS REFERENCE TO RELATED APPLICATIONS

This U.S. utility patent application claims priority to Chinese Patent Application No. 2024107250622 filed on Jun. 5, 2024, the content of which is incorporated herein by reference in its entirety.

FIELD OF THE INVENTION

The present disclosure generally relates to intermediate shaft assemblies for motor vehicles, and more specifically, to an intermediate shaft assembly for a vehicle having three coaxial shafts connected to one another.

BACKGROUND OF THE INVENTION

Intermediate shafts (I-shafts) are designed to be a component of torque transfer from a steering column to a steering gear. Known I-shafts have a pair of coaxial shafts connected to another. During a collapse event, such as in a vehicle crash, the pair of shafts can typically collapse relative to one another in telescoping fashion, such that length of the I-shaft decreases. With there being only two shafts, the length of collapse is limited, and in some modern applications, is less than desired.

SUMMARY OF THE INVENTION

According to the objects, features and advantages, an aspect of the present disclosure provides an I-shaft assembly. The I-shaft assembly includes an upper shaft extending along an axis between a first upper end and a first lower end. The first lower end has a first tubular wall portion with a first inner surface bounding a first hollow bore extending into the first lower end. An intermediate shaft extends along the axis between a second upper end and a second lower end. The second upper end has a first outer surface and the second lower end has a second tubular wall portion with a second inner surface bounding a second hollow bore extending into the second lower end. The second upper end is disposed in the first hollow bore. A lower shaft extends along the axis between a third upper end and a third lower end. The third upper end has a second outer surface disposed in the second hollow bore. The upper shaft is releasably fixed for controlled movement along the axis relative to the intermediate shaft, and the lower shaft is releasably fixed against movement along the axis relative to the intermediate shaft during a normal operating condition, whereat a maximum axial force is applied along the axis during the normal operating condition. The upper shaft moves along the axis relative to the intermediate shaft and the lower shaft moves along the axis relative to the intermediate shaft during an abnormal operating condition, whereat an axial force greater than the maximum axial force is applied along the axis during the abnormal operating condition.

In accordance with another aspect of the present disclosure, a method of assembling an intermediate shaft assembly includes: providing an upper shaft extending along an axis between a first upper end and a first lower end, with the first lower end having a first tubular wall portion with a first inner surface bounding a first hollow bore extending into the first lower end. Further, providing an intermediate shaft extending along the axis between a second upper end and a second lower end, the second upper end having a first outer surface and the second lower end having a second tubular wall portion with at least one through opening passing radially therethrough, the second tubular wall portion having a second inner surface bounding a second hollow bore extending into the second lower end. Further, providing a lower shaft extending along the axis between a third upper end and a third lower end, the third upper end having a second outer surface with at least one recess extending radially therein. Further yet, disposing the second upper end in the first hollow bore and releasably fixing the upper shaft for controlled movement along the axis relative to the intermediate shaft during the normal operating condition. Further yet, disposing the third upper end in the second hollow bore with the at least one through opening being radially aligned with the at least one recess, and injecting polymeric material into at least one of the at least one through opening and into the at least one recess and allowing the polymeric material to solidify within the at least one through opening and within the at least one recess to fix the lower shaft against movement along the axis relative to the intermediate shaft during the normal operating condition. The polymeric material is configured to shear under a predetermined axial load to allow the lower shaft to move along the axis relative to the intermediate shaft during an abnormal operating condition.

These and other objects, advantages and features will become more apparent to one possessing ordinary skill in the art from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 2 is a longitudinal cross-sectional view taken off-center from a central longitudinal axis of the I-shaft assembly shown in FIG. 1, with the I-shaft assembly shown in a fully assembled, extended, normal operating state;

FIG. 3 is a side view of the I-shaft assembly as shown in FIG. 2, with the I-shaft rotated to illustrate injection through openings extending through an intermediate shaft through which polymeric material is injected to releasably fix the intermediate shaft to a lower shaft;

FIG. 4 is a view similar to FIG. 2, with the I-shaft assembly shown in a fully collapsed, abnormal operating state;

FIG. 7 is a cross-sectional view taken generally along the line 7-7 of FIG. 6.

DETAILED DESCRIPTION

Figure 1:
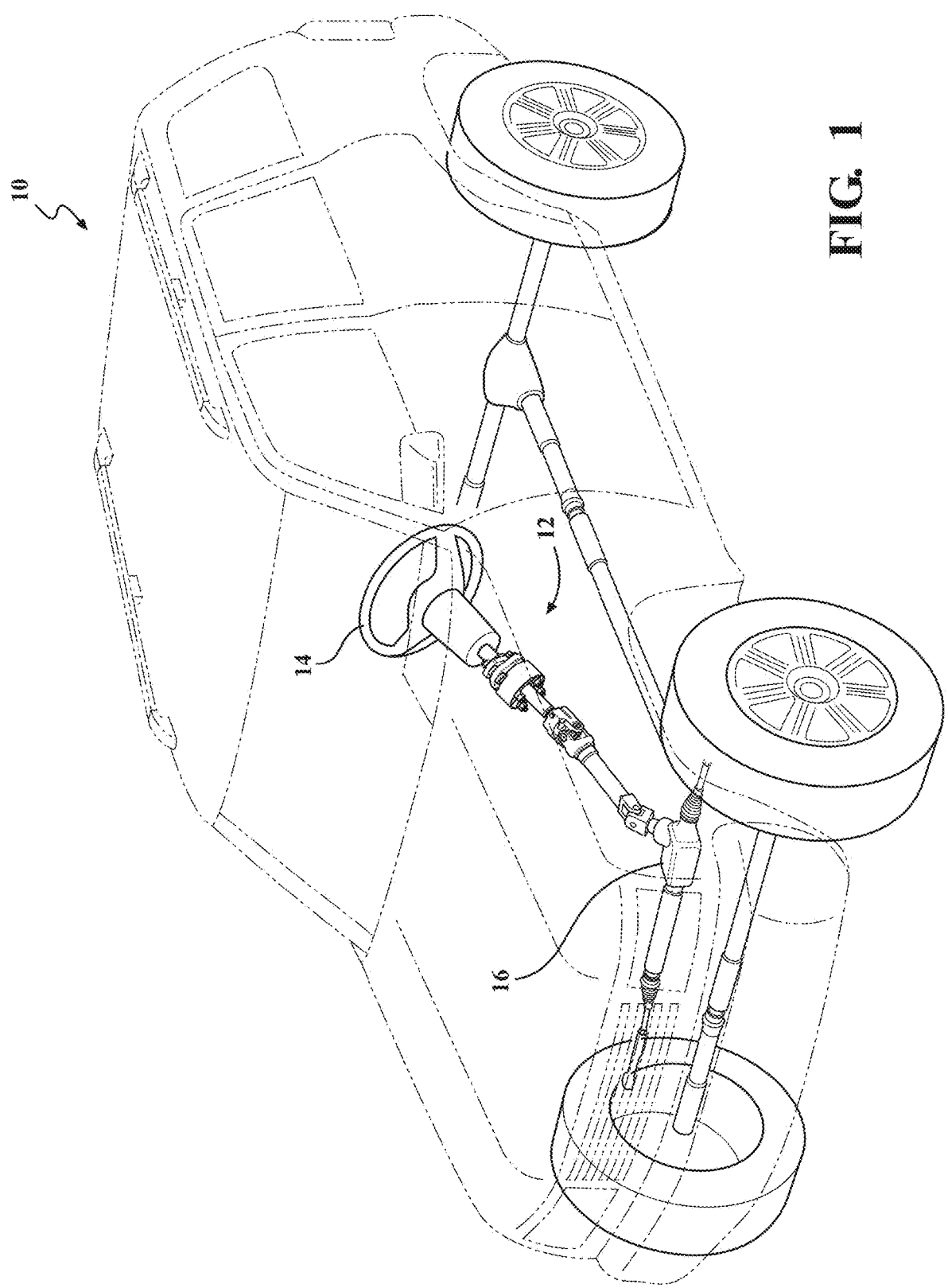
FIG. 1 is a perspective view of a motor vehicle having an I-shaft constructed in accordance with one aspect of the disclosure.
Figure 5:
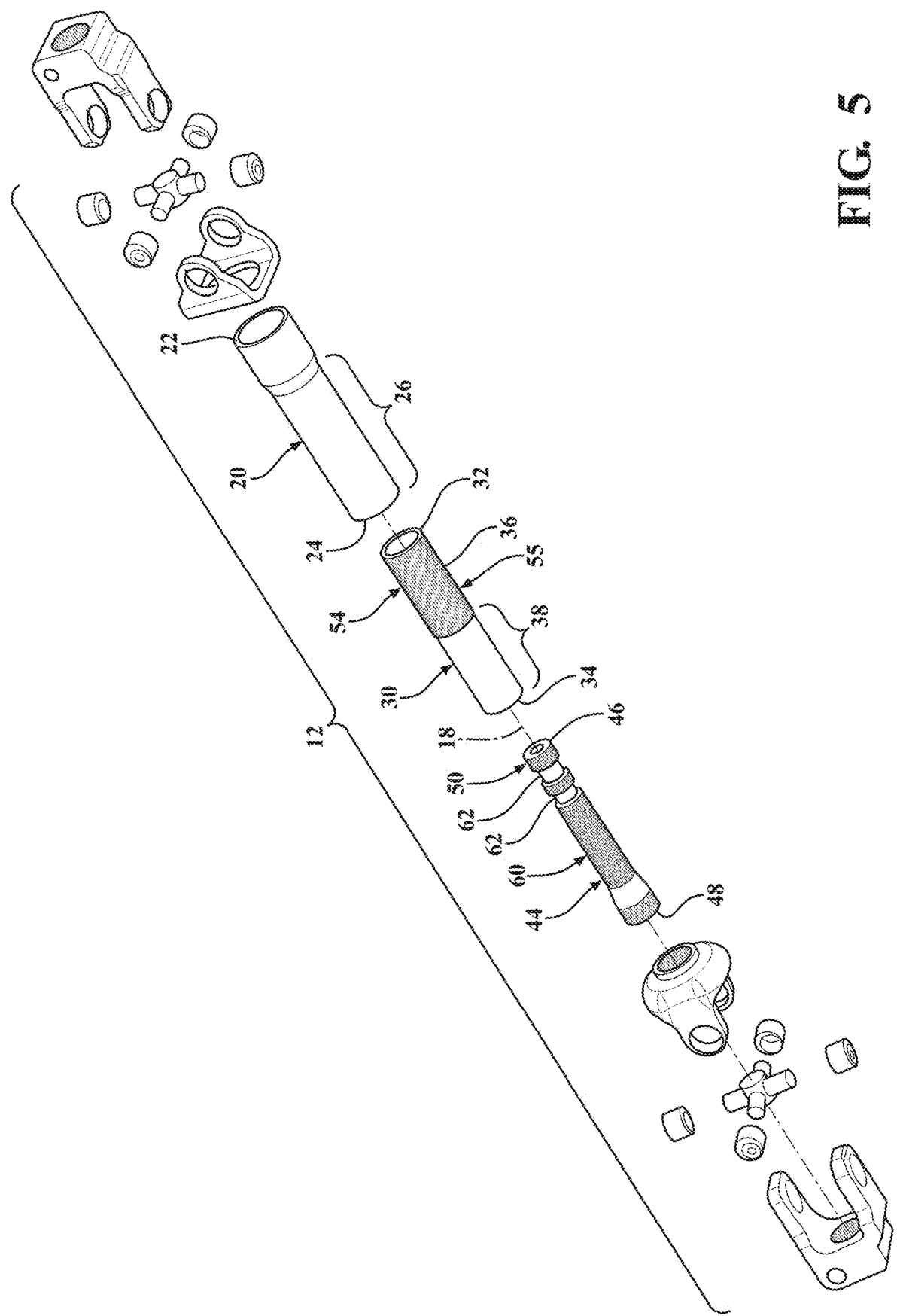
FIG. 5 is an explode perspective view of the I-shaft assembly of FIGS. 2-4.
Figure 6:
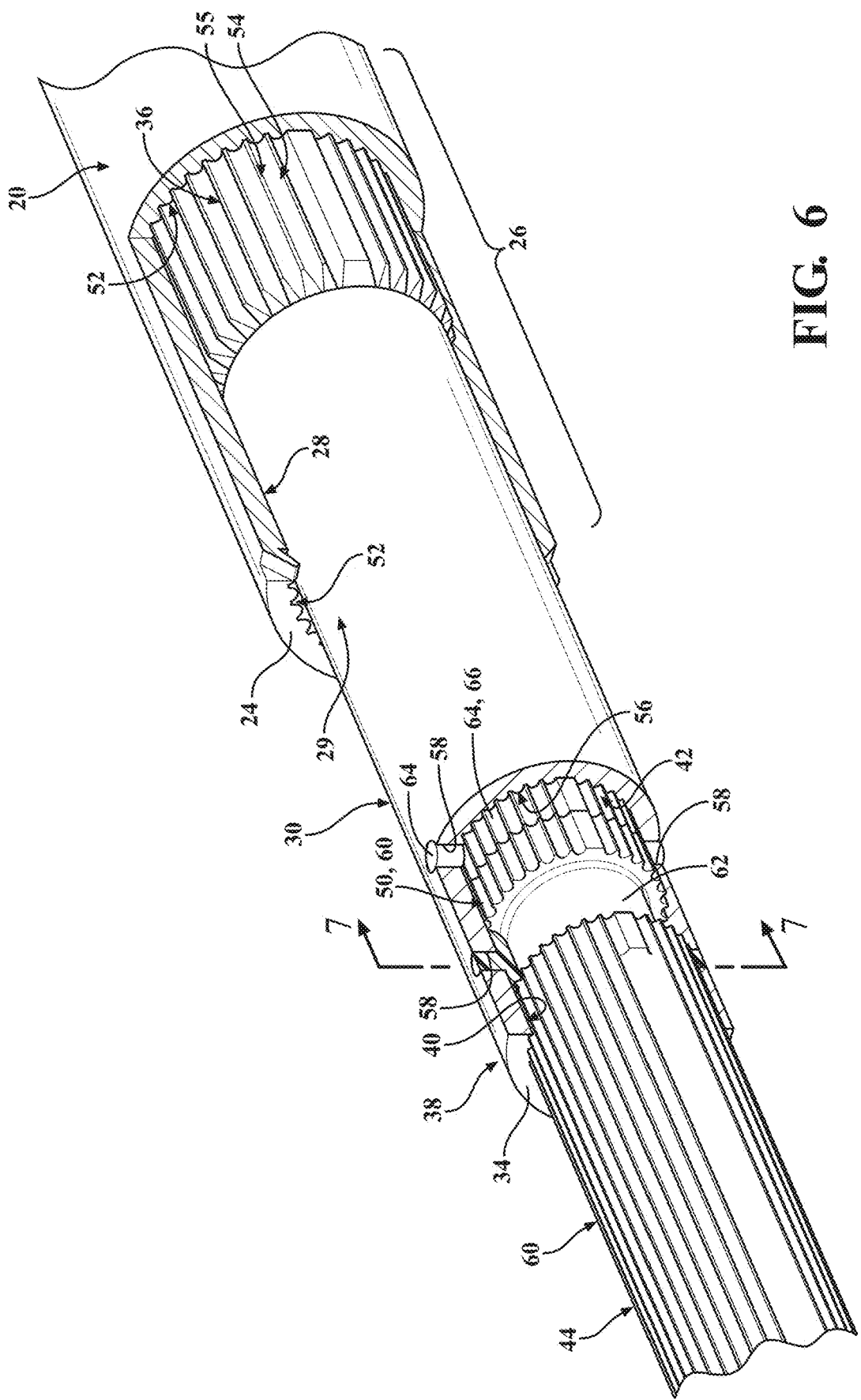
FIG. 6 is a fragmentary, partially sectioned perspective view of the I-shaft assembly of FIGS. 2-3, with a portion of the polymeric material removed from a recess in the lower shaft for clarity purposes only.

Referring now to the Figures, where the invention will be described in greater detail with reference to specific embodiments, without limitation, FIG. 1 illustrates a motor vehicle 10 having an I-shaft assembly 12, constructed in accordance with one aspect of the disclosure for operably coupling a steering wheel 14 to a steering rack or gear 16. As discussed hereafter, the I-shaft 12 includes three shafts coaxially aligned with one along a common central longitudinal axis 18. The I-shaft assembly 12 provides optimal steering performance during a normal operating condition, whereat the length of the I-shaft assembly 12 remains substantially unchanged, with exception of a possible small axial movement between two of the shafts, while also providing an optimal ability of the I-shaft 12 to collapse axially during an abnormal operating condition, such as a crash condition, whereat the three shafts are able to collapse telescopically relative to one another along the central longitudinal axis 18. With the ability of the three shafts to collapse, an increased capacity of axial collapse is provided, thereby minimizing a potential of harm to a driver.

The I-shaft assembly 12 is a three segment assembly, including an upper shaft 20 extending along the central longitudinal axis, referred to hereafter as axis 18, between a first upper end 22 and a first lower end 24. The first lower end 24 has a first tubular wall portion 26 with a first inner surface 28 bounding a first hollow bore 29 extending into the first lower end 24. An intermediate shaft 30 extends along the axis 18 between a second upper end 32 and a second lower end 34. The second upper end 32 has a first outer surface 36 and the second lower end 34 has a second tubular wall portion 38 with a second inner surface 40 bounding a second hollow bore 42 extending into the second lower end 34. The second upper end 32 is disposed in the first hollow bore 29. A lower shaft 44 extends along the axis 18 between a third upper end 46 and a third lower end 48. The third upper end 46 has a second outer surface 50 disposed in the second hollow bore 42. The upper shaft 20 is releasably fixed for controlled movement along the axis 18 relative to the intermediate shaft 30, and the lower shaft 44 is releasably fixed against movement along the axis 18 relative to the intermediate shaft 30 during a normal operating condition, whereat a maximum axial force F1 is applied along the axis 18 during the normal operating condition. The upper shaft 20 moves along the axis 18 relative to the intermediate shaft 30 and the lower shaft 44 moves along the axis 18 relative to the intermediate shaft 30 during an abnormal operating condition, such as a crash condition, whereat an axial force F2 greater than the maximum axial force F1 is applied along the axis 18 during the abnormal operating condition.

FIG. 2 illustrates an exploded view exploded generally along the central longitudinal axis 18 of the I-shaft assembly shown in FIG. 1. The central longitudinal axis 18 is a common central longitudinal axis for each of the upper shaft 20, the intermediate shaft 30 and the lower shaft 44, such the respective shafts 20, 30, 44 are coaxially aligned with one another.

The upper shaft 20, in the embodiment shown, by way of example and without limitation, is a purely tubular member, such that the first hollow bore 29 extends along the entire length of upper shaft 20, such that upper shaft 20 can be readily extruded and subsequently shaped, if desired. Accordingly, the first hollow bore 29 extends from the first upper end 22 to the first lower end 24. The first inner surface 28 of the upper shaft 20 has a plurality of radially inwardly extending first female splines 52. The first female splines 52 extend parallel to the axis 18. In the illustrated non-limiting embodiment, the first female splines 52 extend from the first lower end 24 along the substantial full length adjacent to the first upper end 22, with "substantial" meaning that the first female splines 52 extend nearly to the first upper end 22, but stop just short, such as by about 1-3 inches, of the first upper end 22, with the region of the first inner surface 28 not having the first female spines 52 having a slightly enlarged diameter relative to the first outer surface 36 of the intermediate shaft 30. Accordingly, in the abnormal operating condition, whereupon the I-shaft assembly 12 has collapsed axially, none, or very slight friction is imparted against the first outer surface 36 in the enlarged diameter region. The number of first female splines 52 can be provided as desired for the intended application, end in one non-limiting embodiment, having 48 teeth, to provide the desired friction between the upper shaft 20 and the intermediate shaft 30, thereby allowing controlled axial movement therebetween, such as may be desired during normal operating condition, such as during turning maneuvers, for example.

The intermediate shaft 30 extends along the axis 18 between the second upper end 32 and the second lower end 34. The first outer surface 36 has a plurality of radially outwardly extending first male splines 54 interdigitated with the first female splines 52. The first male splines 54 of the non-limiting embodiment extend from the second upper end 32 toward the second lower end 34, such that the first male splines 54 are fully received for engagement with the first female splines 52 upon assembly of the intermediate shaft 30 to the lower shaft 20. The first male splines 54 are shown as extending along about ⅓ the length of the intermediate shaft 30, by way of example and without limitation. To enhance performance between the intermeshed first female splines 52 and first male splines 54, such as to attain a desired relative slide performance, to reduce noise and vibration, and to enhanced wear properties and performance, a polyamide coating 55 can be provided between the radially inwardly extending first female splines 52 and the radially outwardly extending first male splines 54. The polyamide coating 55 can be provided via applying the coating 55 to either the first female splines 52, or preferably, for sake of ease, to the radially outwardly extending first male splines 54, such as in a dipping process, by way of example and without limitation.

The second inner surface 40 of the intermediate shaft 30 has a plurality of radially inwardly extending second female splines 56. The second female splines 56 of the non-limiting embodiment extend from the second lower end 34 toward the second upper 32. The second female splines 56 are shown as extending along about ⅓ the length of the intermediate shaft 30, by way of example and without limitation. The region of the second inner surface 40 not having female spines, extending from the second female splines 56 to the second upper end 32, has a slightly enlarged diameter D relative to the region of the second inner surface 40 having second female splines 56, thereby allowing reduced friction between the intermediate shaft 30 the lower shaft 44 during the abnormal operating condition, as discussed further below.

The second tubular wall portion 38 of intermediate shaft 30 has at least one through opening 58 adjacent the second lower end 34. The at least one through opening 58 extends radially through the tubular wall portion 38, and is shown as a plurality of through openings 58. The plurality of through openings 58, in the non-limiting embodiment, is shown including a first pair of diametrically opposite through openings 58 and a second pair of diametrically opposite through openings 58. The through openings 58 are shown as being within the region including the second female splines 56. The two pairs of through openings 58 are shown to be axially aligned with one another, such that each through opening 58 of one pair is axially aligned with a through opening 58 of the other pair.

The second outer surface 50 of the lower shaft 44 has a plurality of radially outwardly extending second male splines 60 interdigitated with the second female splines 56 of the intermediate shaft 30. The second male splines 60 are shown extending from the third upper end 46 toward the third lower end 48 along a substantial majority of the length of the second outer surface 50. The second male splines 60 and the second female splines 56, although interdigitated with one another to prevent relative rotation between the intermediate shaft 30 and lower shaft 44 about the axis 18, can be provided having a slight clearance fit with one another, thereby facilitating insertion and assembly of the third upper end 46 of the lower shaft 44 into the second hollow bore 42 of the intermediate shaft 30. Then, upon inserting the third upper end 46 of the lower shaft 44 into the second hollow bore 42 of the intermediate shaft 30 to the desired position, the intermediate shaft 30 and lower shaft 44 are fixed against relative axial movement with one another, as discussed below.

The second outer surface 50 of the lower shaft 44 has at least one recess 62 radially aligned with at least one through opening 58. In the embodiment illustrated, the at least one recess includes a plurality of recesses, with each recess 62 provided as a circumferentially continuous, annular recess 58, and shown as a pair of circumferentially continuous, annular recesses 58 spaced axially from one another along the axis 18. Each recess 58 is radially aligned with a pair of the through openings, shown as a pair of diametrically opposite through openings 58, such the each through opening 58 of each pair is radially aligned with one of the recesses 58 on opposite sides of the recess 58.

To fix the intermediate shaft 30 and the lower shaft 44 against relative axial movement along axis 18 with one another during the normal operating condition, a polymeric material 64 is injected through at least one through opening 58 in the intermediate shaft 30 to at least partially fill the through opening 58, thereby forming a polymeric protrusion, referred to hereafter as protrusion 66, extending within the through opening 58, and through a corresponding recess 62, thereby forming a polymeric annular body, also referred to as annulus 68. The polymeric material 64 fixes the lower shaft 44 against movement relative to the intermediate shaft 30 along the axis 18 during the normal operating condition, whereat the strength, resiliency, and toughness of the polymeric material 64 is sufficient to withstand any axial force applied along the axis 18 during the normal operating condition.

In the illustrated embodiment, the polymeric material 64 completely fills the plurality of through openings 58, such that the protrusions 66 fill the entirety of the through openings 58, and the associated circumferentially continuous, annular recesses 62 radially aligned with each pair of through openings 58, such that the annulus 68 fill the entirety of the recesses 62. Each circumferentially continuous, annular recess 62 is radially aligned not only with an associated through opening 58, but also with a portion of the plurality of radially inwardly extending second female splines 56, and thus, during injection of the polymeric material 64, the polymeric material 64 flows into, conforms about and bonds with the portion of the plurality of radially inwardly extending second female splines 56. Accordingly, the polymeric material 64, upon solidifying, not only prevents relative axial movement between the intermediate shaft 30 and lower shaft 44, but also facilitates preventing relative rotation between the intermediate shaft 30 and lower shaft 44, in combination with the meshed second female splines 56 and the second male splines 60. During the abnormal operating condition, whereat an axial force in excess of the force required to shear the polymeric material 64, particularly across the region where the polymeric material forming the protrusions 66 transitions from the through openings 58 to the polymeric annulus 68 within the recesses 58, is applied along the axis 18, the protrusions 64 filling the one or plurality of through openings 58 are sheared from the annulus 68 filling one or plurality of recesses 62 during the abnormal operating condition, thereby allowing the intermediate shaft 30 and lower shaft 44 to collapse telescopically with one another along the axis 18. It is to be recognized that with the second male splines 60 and the second female splines 56 meshing in a slight clearance fit, also referred to as loose fit, the telescoping movement is made easy and uninhibited by excessive friction.

It is contemplated herein that the number of through openings 58 radially aligned with one recess 62 can be other than a pair, as desired to tune the axial force required to shear the protrusions 64 from the corresponding annulus 66. It is further contemplated that the size (diameter) of the through openings 58 can be selected to attain the desired diameter of protrusions 64, thereby "tuning" the force required to shear the protrusions 64 from the associated annulus 68. Further yet, it is contemplated that a width W of the recess(es) 62 can be selected to attain the desired width of the associated annulus 68, thereby "tuning" the bond and torsional strength of the polymeric material 64 with the second female spines 56.

In accordance with another aspect of the disclosure, a method of assembling an intermediate shaft assembly 12 includes: providing an upper shaft 20 extending along an axis 18 between a first upper end 22 and a first lower end 24, with the first lower end 24 having a first tubular wall portion 26 with a first inner surface 28 bounding a first hollow bore 29 extending into the first lower end 24. Further, providing an intermediate shaft 30 extending along the axis 18 between a second upper end 32 and a second lower end 34, with the second upper end 32 having a first outer surface 36 and the second lower end 34 having a second tubular wall portion 38 with at least one port, also referred to as through opening 58, passing radially therethrough, with the second tubular wall portion 38 having a second inner surface 40 bounding a second hollow bore 42 extending into the second lower end 34. Further, providing a lower shaft 44 extending along the axis 18 between a third upper end 46 and a third lower end 48, with the third upper end 46 having a second outer surface 50 with at least one recess 62 extending radially therein. Further yet, disposing the second upper end 32 in the first hollow bore 29 and releasably fixing the upper shaft 20 for controlled movement along the axis 18 relative to the intermediate shaft 30 during a normal operating condition. Further, disposing the third upper end 46 in the second hollow bore 42 with the at least one through opening 58 being radially aligned with the at least one recess 62, and injecting polymeric material 64, such as any desired variety of plastic, by way of example and without limitation, into at least one of the through opening(s) 58 and into the corresponding recess 62 radially aligned with the through opening(s) 58 and allowing the polymeric material to solidify within the at least one through opening 58 to form a solidified protrusion 66 and within the at least one recess 62 to form a solidified body 68 to fix the lower shaft 44 against movement along the axis 18 relative to the intermediate shaft 30 during the normal operating condition, wherein the polymeric material 64 is configured to shear under a predetermined axial load F2, thereby causing the protrusion(s) 66 to be sheared from the body 68 to allow the lower shaft 44 to move along the axis 18 relative to the intermediate shaft 30 during an abnormal operating condition.

In accordance with another aspect of the disclosure, the method can further include providing the second inner surface 40 of the intermediate shaft 30 having a plurality of radially inwardly extending second female splines 56 and providing the the second outer surface 50 of the lower shaft 44 having a plurality of radially outwardly extending second male splines 60 interdigitated with the second female splines 56. Further, providing the at least one recess 62 as a circumferentially continuous, annular recess 62 extending radially inwardly from the plurality of radially outwardly extending second male splines 60. Further, radially aligning the at least one recess 62 with a portion of the plurality of radially inwardly extending second female splines 56, and causing the polymeric material 64 to fill the circumferentially continuous, annular recess 62 to provide the body 68 as an annular body and to conform and bond with the portion of the plurality of radially inwardly extending second female splines 56.

In accordance with another aspect of the disclosure, the method can further include providing the at least one through opening as a plurality of through openings 58, and injecting the polymeric material 64 into one of the plurality of through openings 58 and allowing the polymeric material 64 to flow out of another of the plurality of through openings 58 to indicate the circumferentially continuous, annular recess 62 being filled with the polymeric material 64.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Individual elements or features of a particular embodiment are generally not limited to that particular embodiment, but, where applicable, are interchangeable and can be used in a selected embodiment, even if not specifically shown or described. Accordingly, the invention is not to be seen as limited by the foregoing description.

Having thus described the invention, it is claimed:

1. An intermediate shaft assembly, comprising:
an upper shaft extending along an axis between a first upper end and a first lower end, said first lower end having a first tubular wall portion with a first inner surface bounding a first hollow bore extending into said first lower end;
an intermediate shaft extending along said axis between a second upper end and a second lower end, said second upper end having a first outer surface and said second lower end having a second tubular wall portion with a second inner surface bounding a second hollow bore extending into said second lower end, said second upper end being disposed in said first hollow bore; and
a lower shaft extending along said axis between a third upper end and a third lower end, said third upper end having a second outer surface, said third upper end being disposed in said second hollow bore,
wherein said upper shaft is releasably fixed for controlled movement along said axis relative to said intermediate shaft and said lower shaft is releasably fixed against movement along said axis relative to said intermediate shaft during a normal operating condition, whereas a maximum axial force is applied along said axis during the normal operating condition,
wherein said upper shaft moves along said axis relative to said intermediate shaft and said lower shaft moves along said axis relative to said intermediate shaft during an abnormal operating condition, whereat an axial force greater than said maximum axial force is applied along said axis during the abnormal operating condition.

2. The intermediate shaft assembly of claim 1, wherein said second tubular wall portion has at least one through opening and said second outer surface has at least one recess radially aligned with at least one of said at least one through opening, and further including a polymeric material at least partially filling said at least one through opening and said at least one recess, said polymeric material fixing said lower shaft against movement relative to said intermediate shaft along said axis during the normal operating condition.

3. The intermediate shaft assembly of claim 2, wherein said at least one recess is a circumferentially continuous, annular recess.

4. The intermediate shaft assembly of claim 3, wherein said polymeric material fills said circumferentially continuous, annular recess.

5. The intermediate shaft assembly of claim 4, wherein said at least one recess includes a plurality of circumferentially continuous, annular recesses spaced axially from one another along said axis.

6. The intermediate shaft assembly of claim 5, wherein said at least one through opening includes a plurality of through openings radially aligned with each one of said plurality of circumferentially continuous, annular recesses.

7. The intermediate shaft assembly of claim 6, wherein said polymeric material fills said plurality of through openings.

8. The intermediate shaft assembly of claim 2, wherein said polymeric material at least partially filling said at least one through opening is sheared from said polymeric material at least partially filling at least one recess during the abnormal operating condition.

9. The intermediate shaft assembly of claim 1, wherein said first inner surface of said upper shaft has a plurality of radially inwardly extending first female splines and said first outer surface of said intermediate shaft has a plurality of radially outwardly extending first male splines interdigitated with said first female splines.

10. The intermediate shaft assembly of claim 9, further including a polyamide coating between said radially inwardly extending first female splines and said radially outwardly extending first male splines.

11. The intermediate shaft assembly of claim 9, wherein said second inner surface of said intermediate shaft has a plurality of radially inwardly extending second female splines and said second outer surface of said lower shaft has a plurality of radially outwardly extending second male splines interdigitated with said second female splines.

12. The intermediate shaft assembly of claim 11, wherein said second tubular wall portion of said intermediate shaft has at least one through opening and said second outer surface of said lower shaft has at least one recess radially aligned with at least one of said at least one through opening, and further including a polymeric material at least partially filling said at least one through opening and said at least one recess, said polymeric material fixing said lower shaft against movement relative to said intermediate shaft along said axis during the normal operating condition.

13. The intermediate shaft assembly of claim 12, wherein said at least one recess is a circumferentially continuous, annular recess extending radially inwardly from said plurality of radially outwardly extending second male splines, wherein said polymeric material fills said circumferentially continuous, annular recess.

14. The intermediate shaft assembly of claim 13, wherein said circumferentially continuous, annular recess is radially aligned with a portion of said plurality of radially inwardly extending second female splines, said polymeric material conforming and bonding with said portion of said plurality of radially inwardly extending second female splines.

15. The intermediate shaft assembly of claim 1, wherein said first hollow bore of said upper shaft extends from said first upper end to said first lower end, and wherein said second hollow bore of said intermediate shaft extends from said second upper end to said second lower end.

16. The intermediate shaft assembly of claim 15, wherein said second upper end of said intermediate shaft is between said first upper end and said first lower end of said upper shaft during the normal operating condition, and wherein said first upper end of said upper shaft is between said second upper end and said second lower end of said intermediate shaft during the abnormal operating condition.

17. The intermediate shaft assembly of claim 16, wherein said second lower end of said intermediate shaft is between said first lower end of said upper shaft and said third lower end of said lower shaft during the normal operating condition, and wherein said first lower end of said upper shaft is between said second lower end of said intermediate shaft and said third lower end of said lower shaft during the abnormal operating condition.

18. A method of assembling an intermediate shaft assembly, the method comprising:
providing an upper shaft extending along an axis between a first upper end and a first lower end, said first lower end having a first tubular wall portion with a first inner surface bounding a first hollow bore extending into said first lower end;
providing an intermediate shaft extending along said axis between a second upper end and a second lower end, said second upper end having a first outer surface and said second lower end having a second tubular wall portion with at least one through opening passing radially therethrough, said second tubular wall portion having a second inner surface bounding a second hollow bore extending into said second lower end;
providing a lower shaft extending along said axis between a third upper end and a third lower end, said third upper end having a second outer surface with at least one recess extending radially therein;
disposing said second upper end in said first hollow bore and releasably fixing said upper shaft for controlled movement along said axis relative to said intermediate shaft during a normal operating condition;
disposing said third upper end in said second hollow bore with said at least one through opening being radially aligned with said at least one recess; and
injecting polymeric material into at least one of said at least one through opening and into said at least one recess and allowing said polymeric material to solidify within said at least one through opening and within said at least one recess to fix said lower shaft against movement along said axis relative to said intermediate shaft during the normal operating condition,
wherein said polymeric material is configured to shear under a predetermined axial load to allow said lower shaft to move along said axis relative to said intermediate shaft during an abnormal operating condition.

19. The method of claim 18, further including:
providing said second inner surface of said intermediate shaft having a plurality of radially inwardly extending second female splines and providing said second outer surface of said lower shaft having a plurality of radially outwardly extending second male splines interdigitated with said second female splines;
providing said at least one recess as a circumferentially continuous, annular recess extending radially inwardly from said plurality of radially outwardly extending second male splines;
radially aligning said at least one recess with a portion of said plurality of radially inwardly extending second female splines; and
causing said polymeric material to fill said circumferentially continuous, annular recess and to conform and bond with said portion of said plurality of radially inwardly extending second female splines.

20. The method of claim 19, further including providing said at least one through opening as a plurality of through openings, and injecting said polymeric material into one of said plurality of through openings and allowing said polymeric material to flow out of another of said plurality of through openings to indicate said circumferentially continuous, annular recess being filled with said polymeric material.

* * * * *